No. 692,019. Patented Jan. 28, 1902.
C. KOLSHORN.
EDUCATIONAL APPLIANCE.
(Application filed June 29, 1901.)
(No Model.) 2 Sheets—Sheet 1.
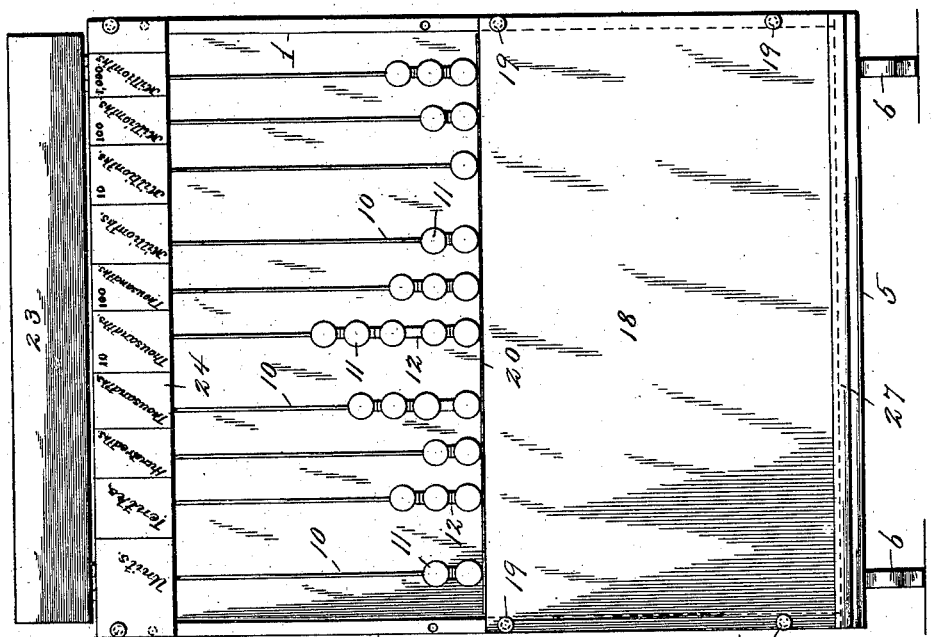
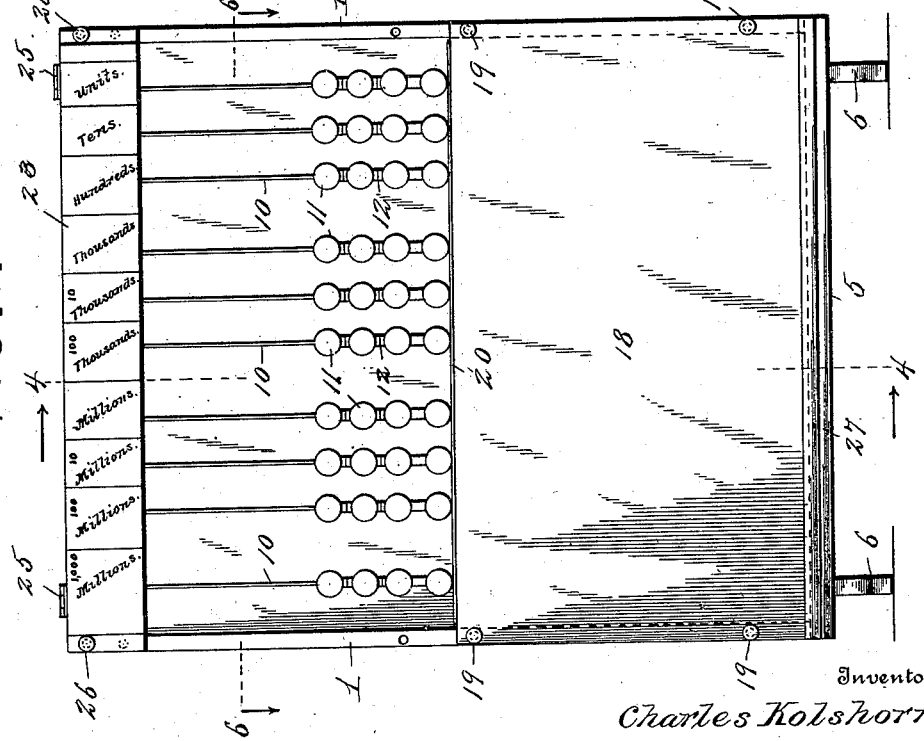
Witnesses
H. L. Amer.
L. E. Tibletts.
Inventor
Charles Kolshorn.
By Rexford M. Smith.
Attorney.

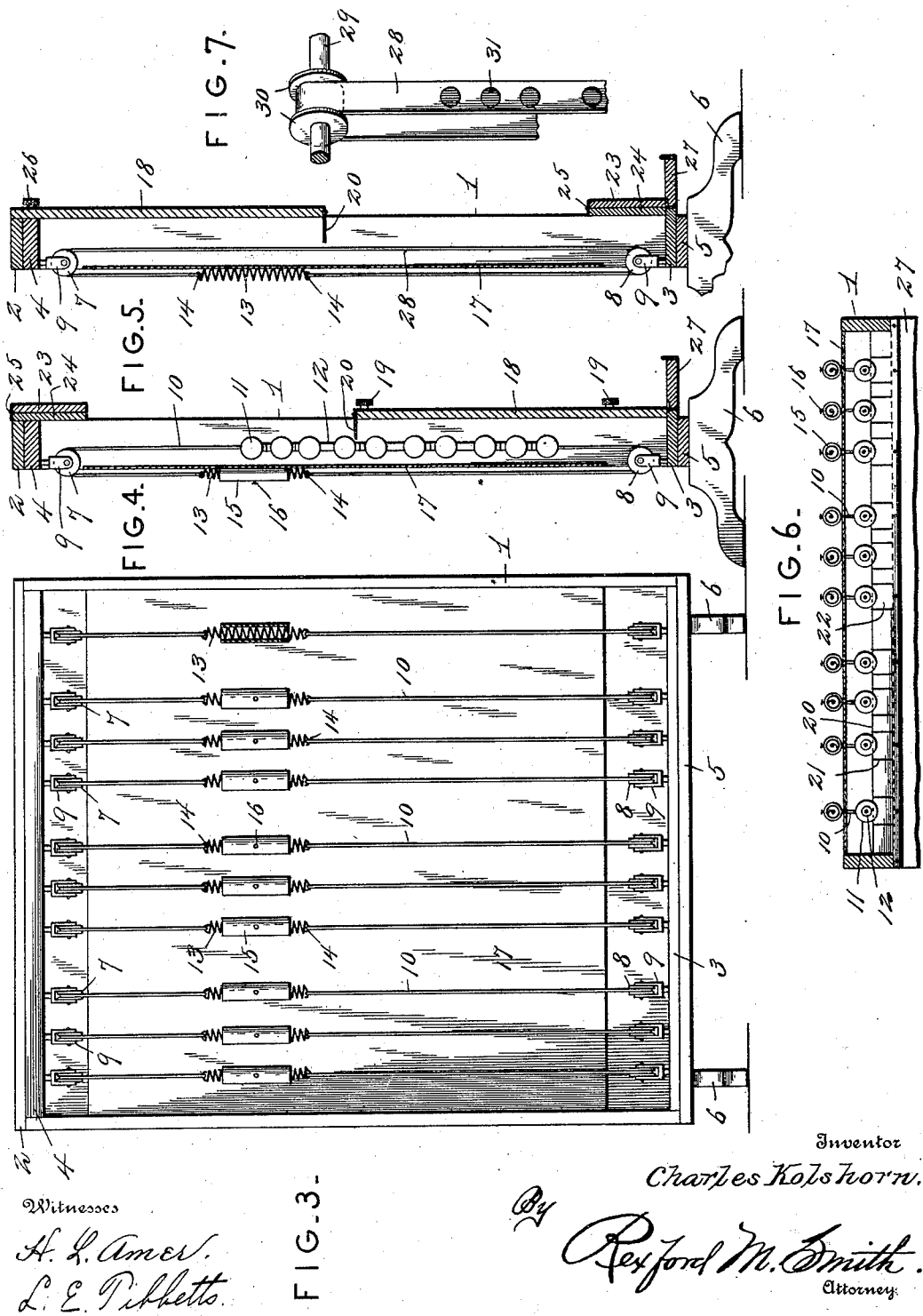

UNITED STATES PATENT OFFICE.

CHARLES KOLSHORN, OF SAVANNAH, GEORGIA.

EDUCATIONAL APPLIANCE.

SPECIFICATION forming part of Letters Patent No. 692,019, dated January 28, 1902.

Application filed June 29, 1901. Serial No. 66,558. (No model.)

*To all whom it may concern:*

Be it known that I, CHARLES KOLSHORN, a citizen of the United States, residing at Savannah, in the county of Chatham and State of Georgia, have invented a certain new and useful Educational Appliance, of which the following is a specification, reference being had therein to the accompanying drawings.

This invention relates to educational appliances, being in the form of a calculator of the abacus type, in which the various arithmetical calculations are performed and facilitated by means of series of movable counters, preferably in the form of balls or representation of balls, upon movable bands, wires, or the like.

The object of the invention is to provide an educational appliance of an attractive and interesting appearance which will enable the various calculations to be performed with ease and rapidity, so as to impress the nature of the calculations upon the youthful mind, the effect being enhanced by the particular manner of grouping the counters and spacing the several series thereof, so as to reduce as far as possible the strain or tension on the eyesight as well as the mind of the pupil. In connection with the device I employ a blackboard for enabling the teacher to demonstrate the problems in writing as well as by the aid of the counters, and I also employ a reversible units-board, the latter, together with the blackboard, being interchangeable or adapted to be substituted one for the other, while the space between said boards constitutes the field in which the movable counters are manipulated and displayed.

A further object of the invention is to provide a novel form of divider, by means of which a sharp line of division is established between the balls which are placed in view of the pupil and those which are intended to be concealed behind the blackboard.

With the above and many other objects in view, the nature of which will appear more fully as the description proceeds, the invention consists in the novel construction, combination, and arrangement of parts hereinafter fully described, illustrated, and claimed.

In the accompanying drawings, Figure 1 is a front elevation of an educational appliance in the form of a calculator constructed in accordance with this invention. Fig. 2 is a similar view showing the reversible units-board swung upward. Fig. 3 is a rear elevation of the parts illustrated in Fig. 1. Fig. 4 is a vertical cross-section on the line 4 4 of Fig. 1. Fig. 5 is a cross-section similar to Fig. 4, omitting the counterbalance-weights and illustrating the employment of flexible tapes in lieu of wires and balls. Fig. 6 is a horizontal section on the line 6 6 of Fig. 1. Fig. 7 is a detail perspective view showing the flexible tapes with representations of balls or counters imprinted thereon.

Like numerals of reference denote like parts in all the figures.

The calculator or educational appliance contemplated in this invention comprises, essentially, an open rectangular frame, consisting of the parallel side uprights 1, connected at top and bottom by the top rail and bottom rail 2 and 3, respectively, the top rail being reinforced by an underlying bar or strip 4, to which are connected the hangers for the upper pulleys, hereinafter described. The frame thus constructed is adapted to be supported on the floor or ground or upon a side wall or partition, being shown in the drawings as adapted for support on the floor by means of a stand or base, comprising a horizontal beam 5, provided adjacent to its opposite ends with supporting-feet 6. It may be stated at this point that the stand or base may be made of any desired height, so as to elevate the frame of the calculator to any desired distance above the floor for facilitating demonstrations. Instead of the stand or base any convenient means may be provided for hanging the frame of the calculator on a wall or other vertical support.

In carrying out the present invention I provide two series of pulleys 7 and 8, located, respectively, at or near the top and bottom of the frame and connected by suitable brackets or hangers 9 with the top and bottom rails of the frame. These pulleys are arranged in vertically-alined pairs, and running over each pair of pulleys is a band 10, which preferably consists of a length of wire or wire cable, although cord or rope may be employed. I have shown ten of such bands in the accompanying drawings; but it will of course be understood that a greater or less number may be employed, according to the capacity of the calculator and the nature of the operations to be performed. Each band 10 carries a series of counters 11, which are preferably in the form of balls mounted fast upon the band and held at a suitable distance from each other by means of spacing sleeves or washers 12. Ten of such counters are mounted on each band to represent the decade system of numbers, and it is preferred to arrange the spacing-sleeves in such manner that the balls or counters will be grouped in series of two and three, as shown in the drawings, in order to enable the pupil to count the number of balls with greater ease and facility. For the same reason the bands 10 are arranged in groups of three, an additional amount of space being left between such groups, so as to facilitate the visual and mental pointing off of the result.

Each of the bands 10 is held taut by means of a spring 13, which is interposed between and connected with the extremities 14 of the band, said spring being preferably in the form of a coil, although rubber bands or other forms of springs may be employed as a substitute for those shown and described. The springs may also be made of sufficient weight to counterbalance the weight of the balls or counters 11 in order to sustain the counters and the bands in any position in which they may be left. Where the springs are light, counterbalance-weights 15 are employed, such weights being in the form of sections of tubing of sufficient size to embrace and partially incase the springs 15, as clearly illustrated in Figs. 3 and 4, the weights being held in place by means of pins or screws 16, which pass through the tubes or sleeves 15 and engage the coils of the springs. By the means described the bands and counters are perfectly counterbalanced, thus adapting the counters to remain in any position to which they are adjusted. Between the front and rear runs of the bands 10 there is interposed a screen 17, in front of which the counters are displayed, said screen serving to conceal from view the weights, springs, and rear portions of the bands.

A portion of the front of the frame is covered by means of a blackboard 18, upon which the teacher may demonstrate some of the problems or calculations in writing. Under the preferred embodiment of this invention the blackboard covers the lower portion of the frame, as illustrated in Figs. 1, 2, and 4, such blackboard being held in place by fasteners 19, preferably in the form of thumb-screws, passing through the blackboard into the side uprights 1. Said board is provided at one edge with an inwardly-projecting flexible divider 20, consisting of a strip of rubber or the like passing along the edge of the blackboard, as shown in Figs. 4 and 5, provided with transverse slits 21, forming a series of tabs or tongues 22, which come in yielding contact with the counters 11, so as to allow the same to move freely up and down. The said flexible divider serves to sharply define the line between the counters which are exposed to the view of the pupil and those which are concealed behind the blackboard, the latter serving as an effective screen for the balls or counters which are not in use. The divider is valuable where the number of spectators is large and some persons are nearer to the appliance than others, and especially where some are standing and others sitting, so that the lines of vision are at varying angles. The frame is also equipped with a reversible units-board 23, having represented upon its outer surface whole numbers, as indicated in Fig. 1, while beneath the units-board 23 is a decimal-board 24, having the decimals represented thereon, as shown at 22, the printed surface of the board 24 being brought to view when the reversible units-board 23 is thrown upward, as shown at Fig. 2, the two boards 23 and 24 being hinged together, as shown at 25, to admit of such adjustment, while both boards are secured to the frame by means of fasteners, preferably in the form of thumb-screws 26, which pass through the decimal-board 24 into the calculator-frame. Under the arrangement described it will be seen that the blackboard and units-board may be interchanged, placing the blackboard at the bottom of the frame and the units-board at the top of the frame, as shown at Fig. 4, or vice versa, as illustrated in Fig. 5. This is for the convenience of teachers of either long or short stature. A chalk-holder 27 is hingedly connected to the bottom rail 3 and adapted to fold upward against the blackboard or frame for transportation.

Instead of employing wires or cords 10 and mounting balls 11 thereon for counters it is within the scope of this invention, especially in manufacturing toy calculators, to substitute flexible bands or tapes 28 and to pass the same over stationary rollers 29, arranged at the top and bottom of the frame, in lieu of the pulleys 7 and 8, and to hold the tapes 28 at the proper distance apart the rollers will be provided with pairs of flanges 30, between which the tapes run, and the tapes will have imprinted thereon, as at 31, the representation of disks or balls, which will constitute the counters. Under such arrangement it will be unnecessary to slit the flexible divider in order to form the yielding tabs or tongues 22.

In performing the various calculations the same may be best understood by giving examples. To add sixty-eight and twenty-seven, display "68," showing six balls on the band representing the tens-column and eight on the units-band. Add two units, making ten, (bearing five in mind.) Exchange the ten units for one ball of the tens-band. Add the remaining five units by bringing five balls into view. Add two to the tens. Result, "95," shown by the apparatus.

To subtract forty-six from ninety-two, display "92." Subtract two units, (bearing four in mind.) Exchange one ten for ten units by lowering one ball on the tens-band and bringing ten units into view. Subtract the remaining four units. Subtract four tens. The calculator will then display "46," which is the answer.

To multiply seven by nine, add nine seven times. The calculator will be found a splendid medium to demonstrate the multiplication-table to pupils. It will be found that they will learn it more easily and rapidly and that they will understand and retain what they are learning.

To divide nine hundred and forty-five by two hundred and thirty-four, subtract the smaller amount from the larger as often as possible and count how many times it can be done. The pupil will find that it can be done four times, and the calculator will show a remainder of nine units.

As decimals have the same property as whole numbers, ten of one value being equal to one of the value next to the left, they can be figured out and demonstrated in the same manner as whole numbers, it only being necessary to remember the values of the rows which figure in the operation.

The value of the device for demonstrating arithmetical calculations is also enhanced by coloring the balls or counters in such a way as to provide a strong contrast between the rows of different values. For example, the counters in the units-column may be dark green; in the tens-column, pink; hundreds, white; thousands, light green; ten thousands, dark blue; hundred thousands, yellow; millions, purple; ten millions, light blue; hundred millions, red; thousand millions, brown, the same colors representing, respectively, the thousand millionths, hundred millionths, ten millionths, &c. The eye will thus become accustomed to recognizing the values of the counters in any position by the color of such counters, and this idea is applicable equally to the construction in which balls are used or tapes with the counters represented thereon.

For the sake of cheapness it is preferred to pass the tapes around stationary rods or rolls; but it is, of course, within the scope of this invention to provide independent sets of rotatable rollers for each tape. Another advantage in employing tapes resides in the fact that as they can be moved all the way around the rollers, so as to expose every portion thereof, the counters may be multiplied or greatly increased and counters of different characters may be represented on the tapes. This will also enable the apparatus to be used for object lessons in natural history, botany, &c., by representing animals, flowers, birds, fishes, &c., on the tapes. In a full-size apparatus three hundred different animals may be represented on the tapes, ten on the front portion and twenty on the rear portion of each tape, or the same number of flowers or birds or fishes may be represented thereon. For instance, the units-tape may consist of ten objects, such as a sheep, an ox, a tiger, a puma, a leopard, a zebra, a hyena, a lion, a deer, and a dog. The teacher could counteract the curiosity of the pupils by first showing and explaining all of these pictures. With the tapes it is also practicable to use a blackboard of one-half the height, more or less, of that illustrated in the drawings, thus greatly increasing the field in which the counters or other objects are displayed.

It will be understood that the flexible bands 10 may be composed of wire of steel, copper, or other metal, or of cord, leather, or other material; also, that the counters may consist of balls or solid objects of glass, wood, or any preferred material, that stationary or revoluble rollers may be substituted for the pulleys, and that any number of flexible bands or tapes may be employed. These and other modifications in the form, proportion, and minor details of construction may be resorted to without departing from the principle or sacrificing any of the advantages of the invention.

Having thus described the invention, what I claim as new, and desire to secure by Letters Patent, is—

1. In a calculator, the combination with a frame, of a series of movable bands, and a series of counters carried by and movable with the bands, and clustered in groups of variable number.

2. In a calculator, the combination with a frame, and a board covering a portion thereof, of counters arranged in vertical series and adapted to be moved behind the board, and a flexible divider extending across all of the series of counters, said divider being attached to the board and adapted to contact with the counters as the latter are moved.

3. In a calculator, the combination with a frame, and a board covering a portion thereof, of series of counters movable up and down behind the board, and a flexible divider extending across all of the series of counters, said divider being attached to the board and slitted transversely to form yielding tabs or tongues which operate in contact with the movable counters.

4. In a calculator, the combination with a frame, and a board covering a portion thereof, of a series of flexible bands running over guides adjacent to the top and bottom of the frame, counters carried by said bands, and weights associated with the bands for counterbalancing the counters.

5. In a calculator, the combination with a frame, and a series of movable counters mounted therein, of a reversible board mounted on the frame and having designated thereon the denominations which the several series of counters represent.

6. In a calculator, the combination with a frame, a series of flexible bands, and counters mounted on and movable with the bands, of a blackboard covering a portion of the frame, a reversible units-board covering another portion of the frame, and means whereby the said boards may be interchanged or substituted one for the other.

7. In a calculator, the combination with a frame, of a series of flexible bands running over upper and lower sets of guides, counters on said bands and movable therewith, springs connecting the extremities of the bands, and counterbalance-weights of tubular form embracing the springs, substantially as described.

8. In a calculator, the combination with a frame, and a board covering a portion thereof, of a series of flexible bands carrying counters and extending over upper and lower guides and having their extremities connected, and a screen interposed between the front and back runs of the bands, substantially as described.

In testimony whereof I affix my signature in presence of two witnesses.

CHARLES KOLSHORN.

Witnesses;
JOHN JUCHTER,
C. H. HANUS.